United States Patent [19]

Brower et al.

[11] Patent Number: 5,027,726

[45] Date of Patent: * Jul. 2, 1991

[54] AUTOMATIC ROLL TO ROLL QUILTING MACHINE FOR SPECIALIZED QUILTING OF PATTERNS

[75] Inventors: David Brower, Tarzana; Thomas K. Jernigan, North Hollywood, both of Calif.

[73] Assignee: TD Quilting Machinery, Burbank, Calif.

[ * ] Notice: The portion of the term of this patent subsequent to Nov. 13, 2007 has been disclaimed.

[21] Appl. No.: 573,987

[22] Filed: Aug. 28, 1990

Related U.S. Application Data

[62] Division of Ser. No. 398,091, Aug. 24, 1989, Pat. No. 4,969,410.

[51] Int. Cl.[5] ................ D05B 11/00; D05B 21/00
[52] U.S. Cl. .................. 112/117; 112/121.14; 112/121.12; 112/266.1
[58] Field of Search ............. 112/266.1, 262.3, 119, 112/117, 118, 121.14, 121.12, 121.11, 103; 364/470, 400

[56] References Cited

U.S. PATENT DOCUMENTS

| | | | |
|---|---|---|---|
| 3,765,349 | 10/1973 | Gerber | 112/121.14 |
| 4,503,788 | 3/1985 | Giannuzzi et al. | 112/121.14 X |
| 4,860,675 | 8/1989 | Brower et al. | 112/119 |
| 4,876,976 | 10/1989 | Brower et al. | 112/262.3 |

*Primary Examiner*—Peter Nerbun
*Attorney, Agent, or Firm*—Thomas Rozsa

[57] ABSTRACT

A roll to roll machine which incorporates the features of using a video camera and monitor to locate an intersection of a sewing needle and material and create a visual image of this intersection so that a remote operator can create a pattern of thread sewn into the material as the material passes from one or more feed rollers to a pickup roller. The movement of the vertically oriented U-shaped frame which carries the sewing machine head is controlled by one process controller while the sewing and stitching functions of the sewing machine head is controlled by a second process controller.

27 Claims, 3 Drawing Sheets

AUTOMATIC ROLL TO ROLL QUILTING MACHINE FOR SPECIALIZED QUILTING OF PATTERNS

This is a Divisional Patent application of Co-Pending Patent application Ser. No. 07/398,091 filed 08/24/89 now U.S. Pat. No. 4,969,410.

BACKGROUND OF THE INVENTION

1. FIELD OF THE INVENTION

The field of the present invention relates to roll to roll quilting machines which are large structures which have a multiplicity of rolls which cause a fabric to move in the Y-axis direction and a fixed sewing machine head attached to a frame which can be caused to move in the X-axis direction relative to the direction of movement of the fabric, as well as partially in the Y-axis direction to thereby sew several fabrics together or stitch a pattern into the fabric. The field of the present invention also relates to industrial sewing machine apparatus and processes used to sew patterns and stitching into large fabrics, which sewing operation is not easily performed on conventional sewing machines. The field of the present invention also relates to machines which include a method of duplicating a selected pattern over an entire bedspread or quilt. Finally, the field of the present invention relates to computer controlled quilting machines wherein the stitching pattern of the sewing machine head and the table movement of the frame relative to the sewing machine head are both controlled by separate computers or process controllers.

2. DESCRIPTION OF THE PRIOR ART

Industrial roll to roll sewing machine operations are known in the prior art. Patterns and stitching into fabrics is commonly performed on industrial sewing machines. The roll to roll sewing machine comprises three rolls. Describing a conventional roll to roll sewing machine from left to right, a first roll feeds lower outer covering material such as cotton. A second roll feeds filler material such as bottom, down, or synthetic filler. A third roll feeds outer upper covering material such as cotton, silk, etc. The three rolls are brought together and are caused to pass beneath the sewing head. After the thread has been stitched or sewn into the combined outer upper and lower covering fabric and filler material, the combined fabric is guided to the fourth pickup roll which winds the combined outer and inner covering material and internal filler onto the roll. Between the third roll carrying the outer covering fabric and the fourth pickup roll is the sewing machine head. The sewing machine head is supported on a heavy generally vertically oriented U-shaped frame which can be moved back and forth in a generally perpendicular direction relative to the direction of travel of the fabric and internal filler as it moves from roll to roll. For example, if the fabric is moving in the Y-axis direction, then the frame and sewing machine head is caused to move in the X-axis direction across the entire width of the fabric. In some roll to roll sewing machines, the frame is also capable of limited movement in the Y-axis direction for a short distance. The U-shaped frame is vertically oriented and has the sewing machine plate at the tip of the lower arm of the U and running immediately beneath the fabric while the upper arm of the U supports the sewing machine head. The needle from the sewing machine is positioned to s just intersect the fabric as it passes between the arms of the U so that thread which is also supported on a bobbin attached to either the sewing machine head or the upper arm of the U can be sewn through the combined upper outer fabric and internal filler and lower outer fabric and through the sewing machine plate to complete the stitching. The U-shaped arm is guided by a conventional mechanism such as a roller positioned in a track so that it can be moved back and forth in the X-direction. The U-shaped arm is also supported on a limited track by rollers to enable it to move back and forth in the Y-direction for a distance approximately equal to the throat of the U.

In the prior art, the entire operation is made by hand and an operator stands on a catwalk positioned between the three feed rollers and the the U-shaped arm and pickup roller. The upper arm of the U has a handle and the operator can hold onto the handle and pull and push the arm and sewing machine head in the Y-direction and also pull and push the arm and sewing machine head in the X-direction. Since the operator is standing adjacent the intersection of the sewing needle and the fabric, the operator will have no problem seeing the stitch being made and can easily hand guide the sewing needle relative to the fabric to sew a desired pattern in the fabric. However, the U-shaped arm and attached sewing machine head is a heavy piece of equipment and the constant physical movement of such heavy equipment coupled with the fact that the operator must stand while performing the function takes its toll over a period of time. As the day progresses, the operator becomes more tired and therefore mistakes can easily occur. In addition, if the pattern to be sewn is complex, it is a physical chore to move the sewing head relative to the fabric in a quick and efficient manner.

Therefore, one major flaw in the prior art embodiments of roll to roll machines is the fatigue and heavy work factor it places on the workers.

The current method for computer programmable quilting patterns uses a digitizer/cursor board with a method of plotting patterns. It is also used in the design of patterns and is accomplished on a scaled down version of the patterns. Plotting is accomplished using a mouse for indexing points on an XY axis. The points are programmed and followed through use of the computer. The prior art uses standard patterns which are preprogrammed into the computer and selected individualized patterns which are created as the bedspread or quilt is on the machine.

Sewing machines and various frame quilting apparatus and processes have previously been patented. The following is representative of the types of apparatus and processes which have been patented:

1. U.S. Pat. No. 4,188,893 issued to Shimazaki in 1980 for "Device Of Detecting Cloth Feeding Amount In Sewing Machines".
2. U.S. Pat. No. 3,377,968 issued to Story in 1968 for "Material Holding And Guide Attachment For Sewing Machine".
3. U.S. Pat. No. 4,429,364 issued to Maruyama et al. in 1984 for "Sewing Machine-Pattern Data Processor".
4. U.S. Pat. No. 1,958,893 issued to Kintner et al. in 1934 for "Photosensitive Apparatus".
5. U.S. Pat. No. 4,583,181 issued to Gerber et al. in 1986 for "Fabric Flow Related System".
6. U.S. Pat. No. 3,500,777 issued to Kalning et al in 1970 for "Quilting Apparatus".
7. U.S. Pat. No. 3,757,710 issued to Landoni in 1973 for "Automatic Quilting Machine".

8. U.S. Pat. No. 3,312,184 issued to Cash in for "Quilting Machine Of The Endless Guide Track Type".

9. U.S. Pat. No. 4,526,116 issued to Mannel in 1985 for "Method And Arrangement To Control An Automatic Embroidery Machine".

10. U.S. Pat. No. 4,403,559 issued to Hirose in 1983 for "Programming System For A Sewing Machine".

11. U.S. Pat. No. 4,669,405 issued to Resta et al. in 1987 for "Quilting Machine With Relatively Moving Cloth Holder Carriage And Sewing Head".

12. U.S. Pat. No. 4,759,302 issued to Yanagi in 1988 for "Sewing Machine".

13. U.S. Pat. No. 4,385,570 issued to Yanagi in 1983 for "Programming System For Automatic Sewing Machine".

14. U.S. Pat. No. 4,674,421 issued to Iwase in 1987 for "Sewing Machine".

15. U.S. Pat. No. 4,498,404 issued to Sadeh in 1985 for "Automatic Sewing Apparatus".

16. U.S. Pat. No. 4,660,484 issued to Yasui in 1987 for "Stitch Pattern Input Device For Sewing Machines".

17. U.S. Pat. No. 4,262,613 issued to Landoni in 1981 for "Apparatus For Controlling The Transverse Movement Of A Fabric Supporting Carriage In A Quilting Machine.".

U.S. Pat. No. 4,188,893 to Shimazaki discloses an apparatus for test running a pattern by matting the X-Y grid on an oscilloscope in order to test the pattern to be sure that the proper pattern is run before actual cloth is used (and wasted).

U.S. Pat. No. 1,958,893 to Kintner et al. discloses the use of a video camera in conjunction with a missile projecting apparatus. The camera has a photosensitive eye for regulating the activity of the apparatus, wherein the position of the photo-sensitive eye and the projecting device are so related that the missiles are projected in accordance with the position of the target.

U.S. Pat. No. 3,377,968 to Story illustrates a particular type of guiding apparatus for holding material and guiding it relative to the sewing machine.

U.S. Pat. No. 3,500,777 to Kalning et al. illustrates what is now the well known quilting machine with multiple sewing heads.

U.S. Pat. No. 3,312,184 to Cash illustrates a quilting machine which allows independent movement of the quilt holder in any direction. The machine is capable of sewing two or three reproductions of the same sewing line into the same quilt at the same time.

U.S. Pat. No. 4,526,116 to Mannel discloses an automatic quilting machine wherein a video camera is used to pick up certain patterns of a motif carrier and transmit them to the sewing machine. Here, the pattern is automatic from a predetermined pattern.

U.S. Pat. No. 3,757,710 to Landoni discloses an automatic quilting machine where the heads can be changed so that certain patterns of stitching paths can be alternated with one or more types of different patterns.

U.S. Pat. No. 4,429,364 issued to Maruyama involves a computer operated pattern input for a sewing machine.

U.S. Pat. No. 4,583,181 issued to Geber discloses a device to assist an operator in dealing with flaws encountered during the spreading of web material to be cut.

U.S. Pat. No. 4,403,559 to Hirosi discloses a sewing machine having a small X-Y movable table to move fabric relative to the sewing machine needle and an electronically controlled movement means.

The remaining patents were cited a being of interest in one or both of the following two co-pending patent applications also filed by the same inventors:

1. Application Ser. No. 07/220,734 filed 07/18/88 now U.S. Pat. No. 4,860,675 for Automatic Quilting Machine For Specialized Quilting Of Patterns Which Can Be Controlled By A Remote Joy Stick And Monitored On A Video Screen".

2. Application Ser. No. 07/247,696 filed 09/22/88 now U.S. Pat. No. 4,876,976 for "Automatic Quilting Machine For Specialized Quilting Of Patterns Which Can Be Controlled By A Remote Joystick And Monitored On A Video Screen Including Pattern Duplication Through A Reprogrammable Computer".

In addition to the above two co-pending patent applications filed by the inventors, the present inventors have also filed the following additional two co-pending patent applications:

3. Patent application Ser. No. 07/336,007 filed 04/10/89 for "Automatic Quilting Machine For Specialized Quilting Of Patterns Which Can Be Created By A Scanner Or On A Video Screen Utilizing Computer Graphics In Conjunction With A Reprogrammable Computer Which Includes Computer Aided Design".

4. A patent application filed 08/04/89 for "Automatic Quilting Machine And Method For Specialized Quilting Of Patterns With Separate Computers To Control The Stitching And Table Movement Functions".

None of the known prior art apparatus including those disclosed in the above patents enables an operator to individually hand sew an individual pattern into a fabric on a roll to roll quilting machine while remaining at a remote position from the fabric. In present day operations, such hand sewn operations require the operator to physically be on a catwalk between the feed rolls and the pickup roll and to hand move the U-shaped arm principally in the X-direction and partially in the Y-direction as fabric moves in the Y-direction. This is a physically demanding process and causes the operator to tire easily, thereby leading to reduced production and an increase in errors.

Therefore, there is a significant need for an apparatus and process which enables hand sewn individual patterns to be sewn into large fabrics such as quilts and bedspreads in an efficient manner on a roll to roll quilting machine where the worker does not have to physically move the heavy U-shaped arm carrying the sewing head.

None of the prior art patents discloses an individualized reprogrammable computer used in conjunction with an individual selected hand sewn pattern wherein the pattern is first hand designed while the quilt and bedspread is on the frame and thereafter the hand designed individualized pattern is programmed into the computer to be repeated.

In addition, in the prior art, the computer controls all functions including the sewing functions of the machine, every stitch in the movement, and the the X-Y movement function. This creates an extremely complex operation when it is necessary to reprogram the computer. None of the prior art embodiments selectively breaks down the three functions into individualized computer program modes so that reprogramming of one element does not require reprogramming the entire system.

SUMMARY OF THE PRESENT INVENTION

The present invention relates to an automatic quilting machine for use in stitching individual selected patterns into a large fabric such as a bedspread or quilt and stitching together the upper and lower outer fabric and the interior filler material on a roll to roll quilting machine. The outer lower layer of fabric is wound on a roll from which it is unwound and guided by conveyor rollers underneath a catwalk and across a sewing area and below the filler material and thereafter after it has been sewn onto the filler material to a pickup roller. The filler material is wound on a roll from which it is unwound and guided by conveyor rollers underneath a catwalk and across a sewing area and thereafter to a pickup roller. The outer upper layer of fabric is wound on a roll from which it is unwound and guided by conveyor rollers underneath a catwalk and across a sewing area and above the filler material and thereafter after it has been sewn onto the filler material to a pickup roller. Depending on the location and configuration of the rolls, the three rolls can rotate in the same direction or some may rotate in the clockwise while others rotate in the counterclockwise direction. The pickup roller onto which all three materials are wound after being stitched together usually rotates in the counterclockwise direction. A vertically oriented U-shaped frame having an upper arm and a lower arm is positioned relative to the rollers such that the pickup roller lies across the interior of the "U" between the upper and lower arms. The upper arm supports thereon a sewing machine head with the needle pointing downwardly in the direction of the fabric. The lower arm supports the sewing machine plate. The lower arm is supported on a pair of rollers which are positioned in a Y-direction track so that the U-shaped frame can move back and forth in the Y-direction for the distance of the throat of the U. The Y-direction tracks are supported on a brace having rollers which are positioned in X-direction tracks, to thereby permit the U-shaped frame to be moved in the X-direction for the entire width of the roller. Rollers are only one of several conventional means for causing X and Y direction movement and other means such as slides are also used with the present invention. As the upper and lower fabric and filler material are fed from their respective feed rollers to the pickup roller, they pass between the sewing needle and the sewing machine plate so that thread can be sewn or stitched into the fabric and filler material to sew them together or a pattern can be stitched into the fabric. The precise location of the sewing machine needle and fabric is illuminated and a color video camera which is mounted on the upper arm of the U-shaped beam adjacent the sewing machine head is also focused on this location. The color video camera is connected to a monitor so that a visual image of the sewing machine needle and fabric as a stitch is being made can be delivered to the monitor. A machine operator can control the movement of the metal frame which causes the U-shaped frame to move in the X-direction and in the Y-direction for the length of the throat of the U through positioning by a remote joystick and can see the stitch being made by viewing the monitor. Therefore, instead of being required to stand on a catwalk and move the heavy U-shaped frame by hand through a handle attached at the front of the upper arm of the U-shaped frame, the operator can view the entire stitching process from a remote location by viewing the stitch on the video monitor and can direct the movement of the U-shaped frame relative to the fabric as the fabric (and filler) is moved in the Y-direction in order to position the sewing needle for successive stitches while remaining at a remote location from the roll to roll quilting machine.

In addition, the present invention also relates to a reprogrammable function integrated into the system wherein the operator first manually traces the desired pattern using the existing joystick system. At the end of this step, the traced pattern is stored into the memory of the computer as a digitalized image of the pattern. The operator then indicates the position of the machine sewing head for all the repeat quilting areas by physically driving and marking those positions and programming this into the computer. At the end of this step, the computer will have generated and stored a digitalized map of the entire area to be quilted. In the third step of the process, the operator will command the start of the automated quilting generated process and the computer will cause the machine to go to the marked locations on the bedspread or quilt and repeat the individualized pattern which was created by the operator.

Further, the present invention also relates to a system wherein the sewing machine function is controlled by one computer usually located on the sewing machine head and the U-shaped frame X and Y-direction motion is controlled by a separate computer. When it is desired to change a sewing machine computer function such as a stitch or accessory functions such as trim, the sewing machine computer can be independently reprogrammed. When it is desired to change the pattern, the separate computer controlling the U-shaped frame X and Y direction motion can be independently reprogrammed. It is not necessary to reprogram both functions which is an enormous task. Instead, only one of the functions needs to be reprogrammed, thereby greatly simplifying the process.

In general, this is a roll to roll quilting machine. The five key elements of the present invention are: (a) sewing and auxiliary functions; (b) X-Y movement of the U-shaped frame controlled by a remote joystick; (c) video camera and monitor; (d) the electronic coordination of movement and sewing speeds relative to direction and distance of travel caused by the remote joystick; (e) a reprogrammable computer into which the individualized hand generated pattern which has been traced by the operator into a bedspread or quilt through the joystick and viewing the movement on the video monitor can be programmed into the computer and after at least one point for each subsequent pattern duplication has been marked into the computer, the individualized pattern can be duplicated in each desired location of the bedspread or quilt through activation of the reprogrammable computer; and (f) two separate computers, one which controls the sewing machine function and one which controls the U-shaped frame movement in the X and Y directions.

It has been discovered, according to the present invention, that if a video camera connected to a television monitor is focused on the location of the sewing needle and bedspread or quilt location where the needle is stitching the thread into the bedspread or quilt on a roll to roll quilting machine, and the area is further illuminated to provide a clear view, an operator can view the entire stitching process from a remote location and does not have to spend time consuming effort in hand moving the heavy U-shaped frame to hand guide the sewing needle in order to position the needle for each stitch.

It has further been discovered, according to the present invention, that if a U-shaped frame carrying the sewing machine head can be moved relative to the roll of fabric and filler in the X-direction and partially in the Y-direction by a remote operating means such as a joystick, and the U-shaped frame permits the rolls of filler and fabric to be moved in the Y-direction between the arms of the U such that an unobstructed surface area of fabric can come in contact with a needle of the sewing machine head supported on the upper arm of the U, then an operator can cause the bedspread or quilt to be precisely stitched in any desired pattern and/or cause the outer fabrics (upper and lower) of the bedspread to be sewn onto the interior filler material or sewn together with filler material between them, by moving the U-shaped frame and its sewing machine head and needle relative to filler and outer fabrics as they move in the Y-direction from their respective feed rolls to the pickup roll. If the area of the sewing machine head and stitch is further illuminated by a source of light and visually displayed by a video camera fixed to the upper arm of the vertically oriented U-shaped frame and focused on the area of the sewing machine needle and bedspread or quilt, and the picture is transmitted to a monitor, then an operator can be positioned at a remote location and observe the precise formation of the stitch and direction of the pattern being sewn into the bedspread or quilt and can cause the vertically oriented U-shaped frame and sewing machine head and needle to move in the X-direction and limited amount of Y-direction relative to the fabric and filler material as they move in the Y-direction from their respective feed rollers to the pickup roller in order to bring any desired location of the bedspread or quilt into alignment with the sewing machine head so that any desired hand selected pattern or individual pattern can be sewn into the large bedspread or quilt in an efficient manner and/or so that the outer fabric and interior filler material can be sewn together in any desired manner.

It has additionally been discovered, according to the present invention, that if an operator can control the movement of the U-shaped frame carrying the sewing machine head and needle relative to the fabric and can see the precise location of the stitch being made in the fabric from a remote location, the amount of training time required to teach the operator to use the present system is much less than the time used to teach an operator to sew with the prior art roll to roll machines. In addition, the risk of injury to the operator is significantly reduced and the speed of production is significantly increased. In addition, the amount of fatigue on the operator is substantially reduced and therefore the efficiency of work is enhanced and the amount of mistakes are significantly reduced.

It has also been discovered, according to the present invention, that if the system includes a reprogrammable computer into which the specific design is programmed as it is being generated by the operator, the individualized pattern can be subsequently restitched over and over at desired locations through activation of the stitch mode of the reprogrammable computer, thereby eliminating the necessity of the operator having to continuously hand guide the pattern at each new location.

It has further been discovered, according to the present invention, that if one computer controls the sewing function of the sewing machine and a second computer controls the movement of the U-shaped frame, then reprogramming either computer is greatly simplified.

It is therefore an object of the present invention to provide an apparatus by which an operator can remain at a remote location from a large roll to roll quilting machine and cause a precise hand selected pattern to be sewn into the large bedspread, comforter, quilt, or other fabric which is moved from the feed roll to the pickup roll of the roll to roll quilting machine.

It is another object of the present invention to provide an apparatus which enables roll to roll quilting for specialized hand selected patterns and to sew the outer fabrics to the interior filler material or to each other with the filler material therebetween to be quickly and efficiently performed with a minimum amount of training time of the operator and to provide a system which creates substantially less fatigue on the operator.

It is a further object of the present invention to provide an apparatus which can accommodate computerized pattern quilting of a predetermined computer generated pattern and also accommodate specialized hand selected patterns, or any combination thereof, in the same unit.

It is an additional object of the present invention to increase the rate of production of hand guided patterns sewn into large fabrics such as bedspreads or quilts in roll to roll quilting.

It is an additional object of the present invention to enable a hand selected pattern to be sewn into a large fabric such as a bedspread or comforter while an operator is positioned at a distance remote from the moving parts of the machine such as the U-shaped frame carrying the sewing head and sewing machine needle, to thereby significantly reduce the risk of injury to an operator.

It is an additional object of the present invention to provide a system for automatically duplicating the individualized patterns to eliminate the necessity of hand guiding the individualized pattern at each new location where it is stitched into the bedspread or quilt.

It is a further object of the present invention to provide a system wherein the computers which control the sewing machine function and the U-shaped arm movement are segregated to thereby reduce the effort involved in reprogramming the computers.

Further novel features and other objects of the present invention will become apparent from the following detailed description, discussion and the appended claims, taken in conjunction with the drawings.

DRAWING SUMMARY

Referring particularly to the drawings for the purpose of illustration only and not limitation, there is illustrated:

DETAILED DESCRIPTION OF THE PREFERRED EMBODIMENT

Although specific embodiments of the invention will now be described with reference to the drawings, it should be understood that such embodiments are by way of example only and merely illustrative of but a small number of the many possible specific embodiments which can represent applications of the principles of the invention. Various changes and modifications obvious to one skilled in the art to which the invention pertains are deemed to be within the spirit, scope and contemplation of the invention as further defined in the appended claims.

Figure 1:
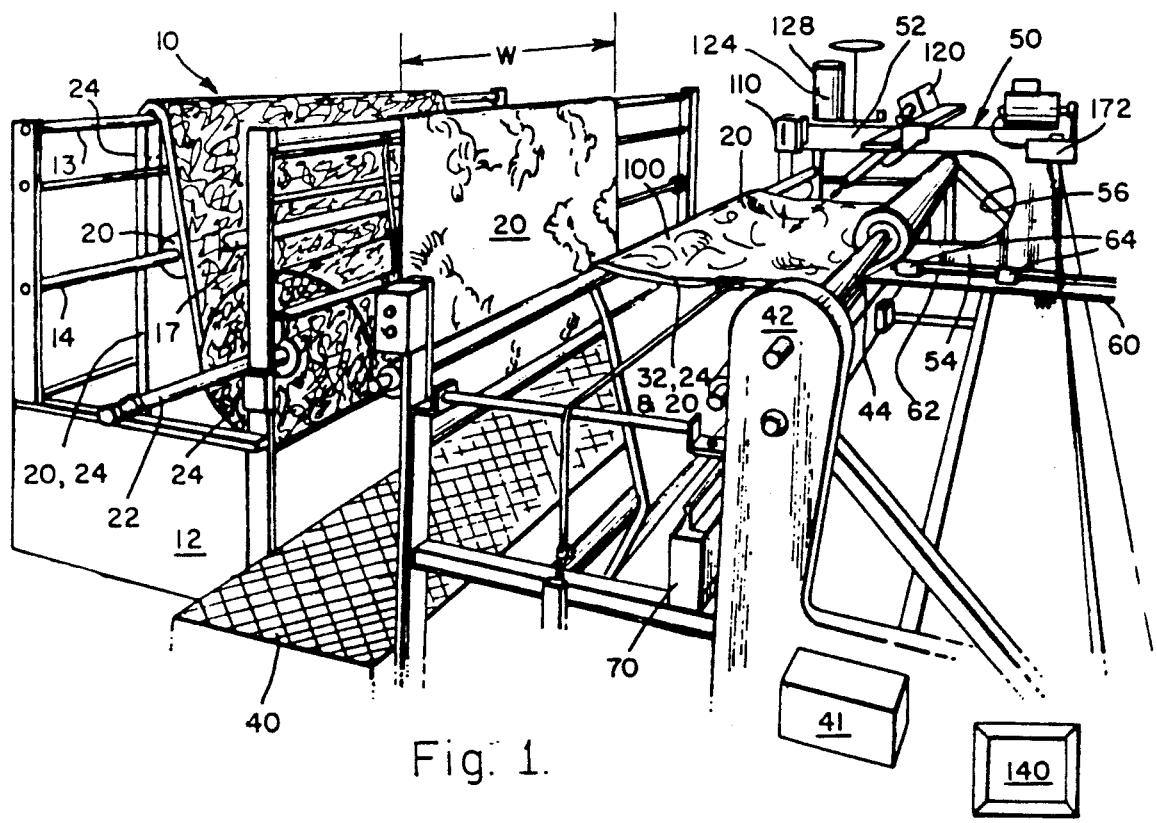
FIG. 1 is a perspective view of the present invention automatic roll to roll quilting machine for specialized quilting of patterns which can be controlled by a remote joystick and monitored on a video screen.
Figure 4:
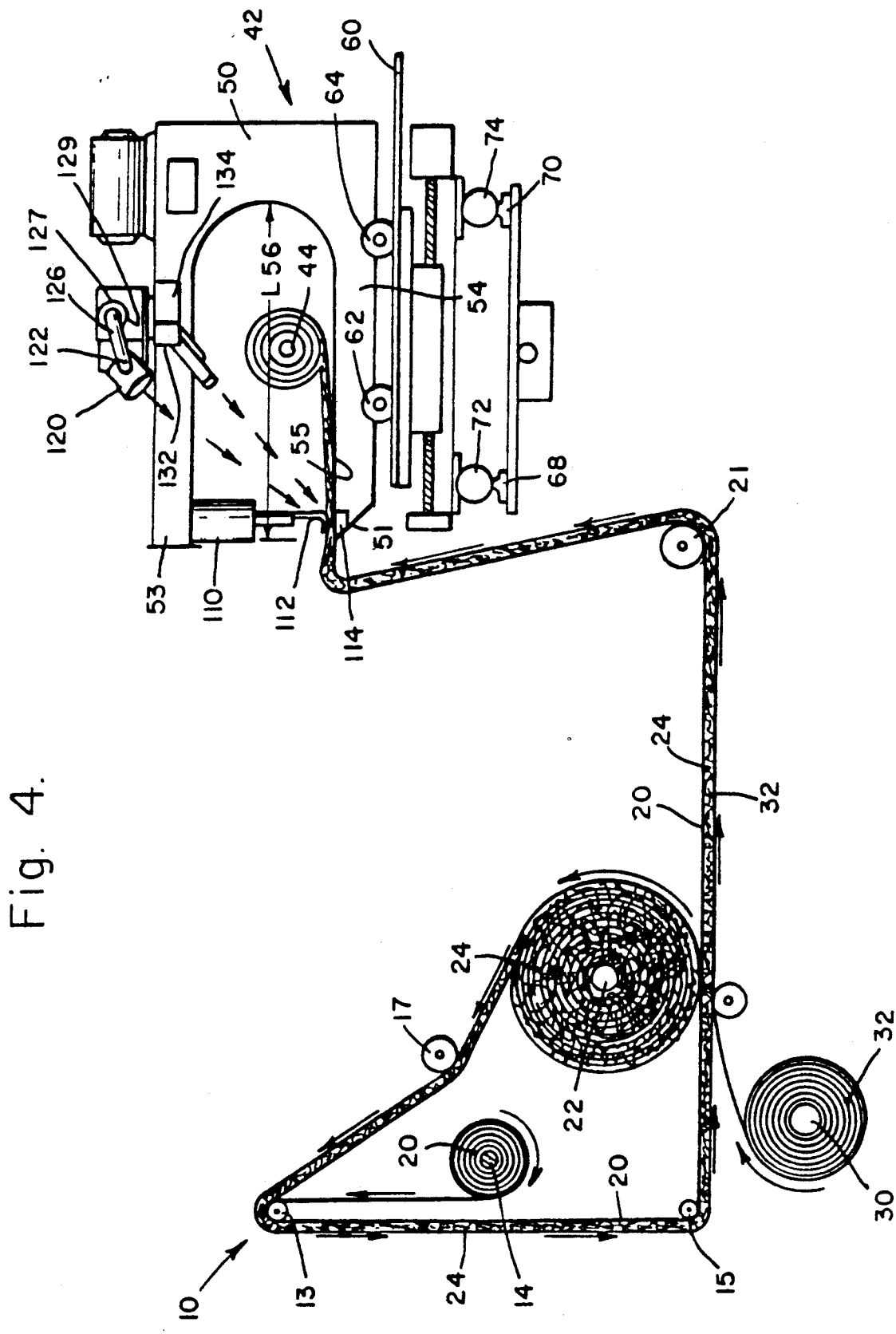
FIG. 4 is a schematic diagram of the flow of material from the three feed rollers feeding outer fabric material, internal filler material, and lower fabric material respectively onto the pickup roller and the three pieces of material being sewn together or having a pattern stitched into them.

Referring to FIGS. 1 and 4, the main structural elements of the present invention automatic roll to roll quilting machine for specialized quilting of patterns which can be controlled by a remote joystick and monitored on a video screen including pattern duplication through a reprogrammable computer, (hereinafter referred to as "automatic roll to roll quilting machine") will be discussed first. The entire automatic roll to roll quilting machine is designated as 10. One type of roll to roll quilting machine is illustrated but it will be appreciated that the present invention can used with any various roll to roll configurations. Moving from left to right, a supporting frame 12 supports thereon at least one feed roller. In the present invention there are three feed rollers, two of which are visible in FIG. 1 and the third is hidden from view but can be seen in FIG. 4. A first feed roller 14 which supports thereon a roll of outer fabric material 20 rotates in the clockwise direction. The outer fabric material 20 is guided over rollers 13 and then to roller 15. A second feed roller 22 which supports thereon a roll of filler material 24 rotates in the counterclockwise direction. The filler material 24 follows underneath the outer fabric material and is also guided under roller 17, over roller 13 and then to roller 15. A third feed roller 30 is located beneath the other two feed rollers and is hidden from view in FIG. 1 but can be seen in FIG. 4. Third feed roller 30 supports thereon a roll of inner or lower fabric material 32. Third feed roller 30 rotates in the clockwise direction and fabric 32 is guided over roller 17. The three lengths of material are caused to move to the right as the three feed rollers 14, 22 and 30 rotate in their respective directions. The lengths of material 20, 24 and 32 are guided along rollers, one possible set of which is illustrated in FIGS. 1 and 4, in a conventional and well known manner. Located to the right of the three rollers is a catwalk 40. The three lengths of material pass together under roller 21 which is located below and to the right of the catwalk 40. Located to the right of the catwalk 40 and the joining roller 21 is the sewing station area which comprises a supporting frame member 42 supporting thereon a pickup roller 44. The three lengths of material 20, 24, and 32 are guided along the guide rollers and under the catwalk 40 and are joined together such that the exterior fabric material 20 is on the outside or top, the filler material 24 is in the middle and the interior fabric material 32 is on the bottom or lowermost, thereby creating a quilt which is a sandwich of the fabric material 20 and 32 on the outside with the filler material 24 on the inside. The pieces of material are wound onto the pickup roller 44 which rotates in the counterclockwise direction to wind the completed quilt. With the rotation of the rollers as previously described, the three pieces of material 20, 24 and 32 move left to right or in the Y-direction. Also supported by the frame member 42 is a movable vertically oriented U-shaped frame member 50 having an upper arm 52 and a lower arm 54 which define the interior throat area 56 of the vertically oriented U-shaped frame. The pickup roller 44 extends transversely through the throat area 56 and is approximately midway between the upper arm 52 and the lower arm 54. A Y-direction track 60 is supported on frame member 42 and a pair of rollers 62 and 64 attached to the lower surface of lower arm 54 enable the U-shaped arm member 50 to move back and forth in the Y direction for a distance from the leading ledge 51 of U-shaped arm member 50 for the interior length "L" of the throat area 56. For electronic movement of the U-shaped arm in the Y direction, the rollers 62 and 64 are connected to any one of conventional movement means such as a well known gear and rack system (such as the one illustrated in co-pending patent applications Ser. Nos. 07/220,734 and 07/247,696). The gear and rack system is driven by a Y-direction motor 168. Also supported on the frame member 42 is a pair of X direction tracks 68 and 70 with a pair of rollers 72 and 74 respectively rolling thereon. It will be appreciated that other conventional movement means well known in the art such as sliding members riding on tracks rather than rollers can be used. The rollers 72 and 74 enable the U-shaped frame member 50 to move back and forth in the X-direction for the entire width "W" of the fabrics 20, 24 and 32. For electronic movement of the U-shaped arm in the X direction, the rollers 72 and 74 are connected to any one of conventional movement means such as a gear and rack system (such as the one illustrated in co-pending patent applications Ser. Nos. 07/220,734 and 07/247,696). The gear and rack system is driven by an X-direction motor 164. It will be appreciated that the structural system illustrated for X-direction and Y-direction movement of the U-shaped frame is only one of any multiplicity of arrangements which enable the U-shaped frame to be moved in the X and Y directions as described above and any conventional system can accommodate the simple X and Y direction movements of the U-shaped frame. Other conventional and well known systems which can be sued are a ball-screw system and a chain and sprocket system.

It will be appreciated that conventional adjustment modifications can be incorporated into this system. For example the overall length L of the throat area 36 can be made larger or smaller depending on the application of the machine. The height of lower arm 54 which carries the sewing plate can be adjusted relative to pickup roller 44 so that the thickness of the combined upper and lower fabric and filler material can be accommodated and the proper stitch can be made. The height of the sewing needle 112 relative to the combined upper and lower fabric and filler material can also be adjusted to accommodate the proper stitch required.

Figure 3:
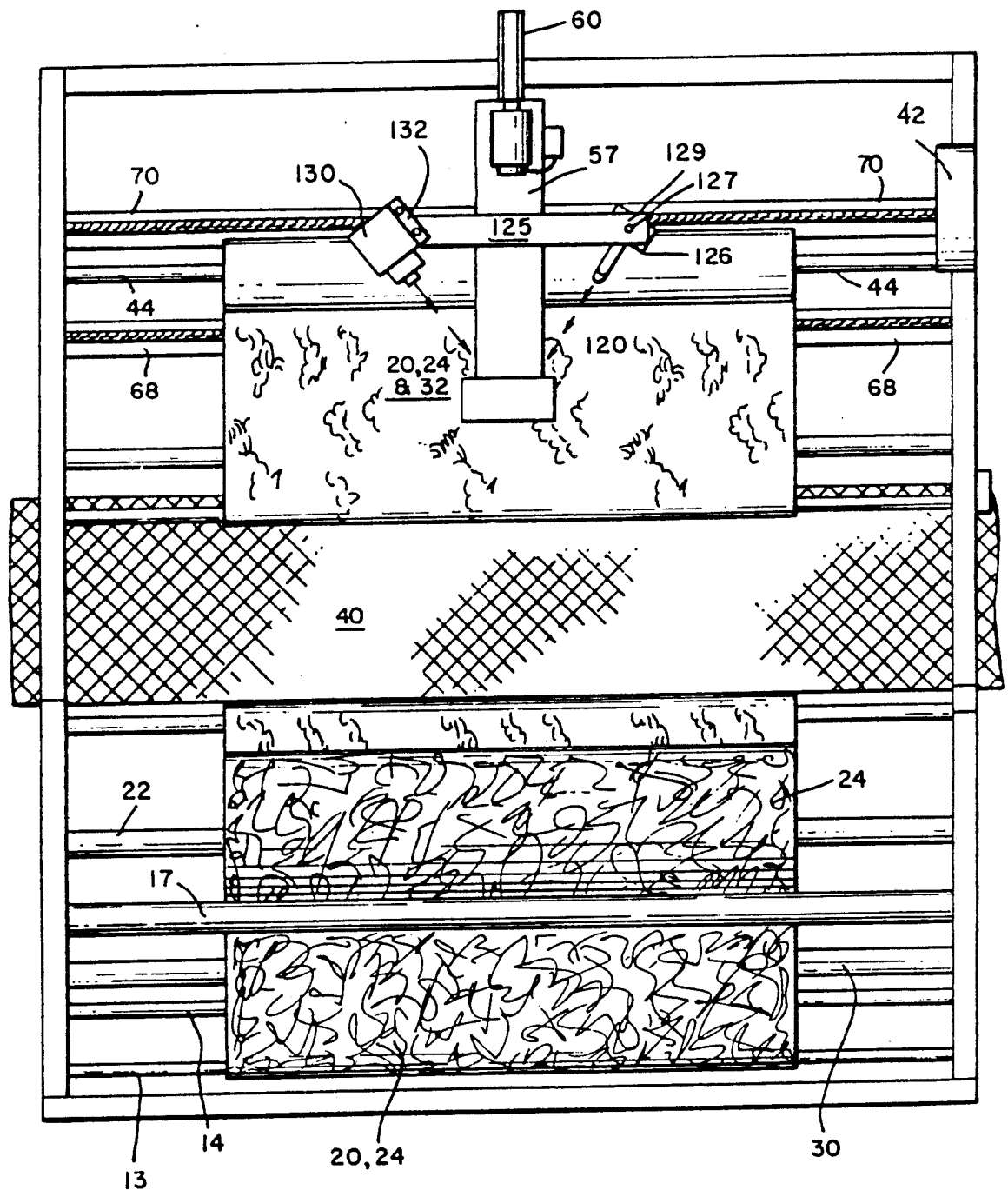
FIG. 3 is a top plan view of the present invention automatic roll to roll quilting machine, illustrating the video camera and light focusing in on the location of the three pieces of material being sewn together or a stitch pattern being sewn into the three pieces of material.

Referring to FIGS. 1, 3 and 4, a sewing machine head 110 is bolted stationary to upper upper arm 52 of U-shaped frame 50. Any industrial machine sewing head which is with the present invention. However, to achieve the goal of the present invention in segregating the computer controlling the sewing functions from the computer controlling the U-shaped frame 50 movement, it is preferred that a sewing machine head having its own computer be used. By way of example, one type of sewing machine head which can be used with the present invention is the Mitsubishi Industrial Sewing Machine Model LS2-180 high speed, single needle lockstitch sewing machine. A second type of sewing machine head can include a machine with a chain stitch such as the Union Special 5630. A microprocessor connected to this type of sewing machine head provides many auxiliary functions such as control of needle position, presser foot lift, undertrim, and tension release disk. Preferably, the sewing machine head 110 is attached to the front 53 of upper arm 52 so that the sewing needle 112 is at the approximate center width position of the upper arm 52 and U-shaped frame 50. In this manner, the sewing needle 112 can reach any portion of the width of the outer fabrics and filler member. The sewing machine plate 114 is formed into the upper surface 55 of lower arm 54 such that plate 114 is aligned with the needle 112, as best illustrated in FIG. 4.

A illustrated in FIGS. 1, 3 and 4, a source of light 120 is attached to the upper arm 52. In one embodiment, a transverse beam 125 is connected to the top surface 57 of the length of the beam 125 by arm 126 by insertion of a bolt 127 into an interior U-shaped slot 129 of arm 126 and affixed at the desired distance and angle relative to the sewing machine head 110 and needle 112. Preferably, the source of light 120 is directed such that the beam of light falls directly on the intersection area between the sewing needle 112 and the sewing machine plate 114. The source of light 120 may have an adjustment means 122 so that the direction of the beam can be altered, depending upon need. In this way, the area being stitched is brightly illuminated. A bobbin 124 is supported by a frame member 125 attached to a location either on sewing machine head 110 or on upper arm 52 as illustrated in FIG. 1. Thread 128 is wound on the bobbin 124 and is guided by conventional means through the sewing machine head 110 and to the needle 112.

A color video camera 130 is mounted to an adjustable mounting bracket 132 which in turn is mounted to a portion of transverse 125 which is in turn mounted on upper surface 57 of upper arm 52. By way of example, adjustable mounting bracket 132 may contain an internal slide 134 and the video camera can be positioned along the slide at any desired location and rotated such that the focus of the color video camera 130 is directly at the intersection of the sewing & needle 112 and the sewing machine plate 114. In this way, since the area is illuminated by the source of light 120, a clear picture of the sewing machine needle 112 performing a sewing or stitching operation can be picked up by the color video camera 130. The color video camera 130 is a high quality full color resolution camera. While a black and white video camera can be used, a color video camera is preferred for distinguishing shades in the fabric pattern. Extra wide angle lenses and/or telephoto lenses may be attached to the color video camera in order to display larger areas or more precise minute areas, as required for the specific operation.

The color video camera 130 is in turn connected to the input of a color monitor 140 and the monitor is connected to an alternating current power source 150. When the color monitor 140 is turned on, the power to the color monitor 140 generates power to the color video camera 130 and the image of the sewing needle 112 and the stitching or sewing operation being performed is picked up by the video camera 130 and transmitted to the color monitor 140 where it can be easily viewed by an operator. Therefore, instead of requiring an operator to be on the catwalk 40 in order to see exactly where the sewing machine needle is stitching a pattern and seeing what pattern is being stitched, the operator merely needs to look at the monitor 140 in order to determine exactly where the needle is located and in what direction it is going so that the subsequent stitches can be accurately guided and made. As with the camera, a black and white monitor can be used, but a color monitor is preferred.

Figure 2:
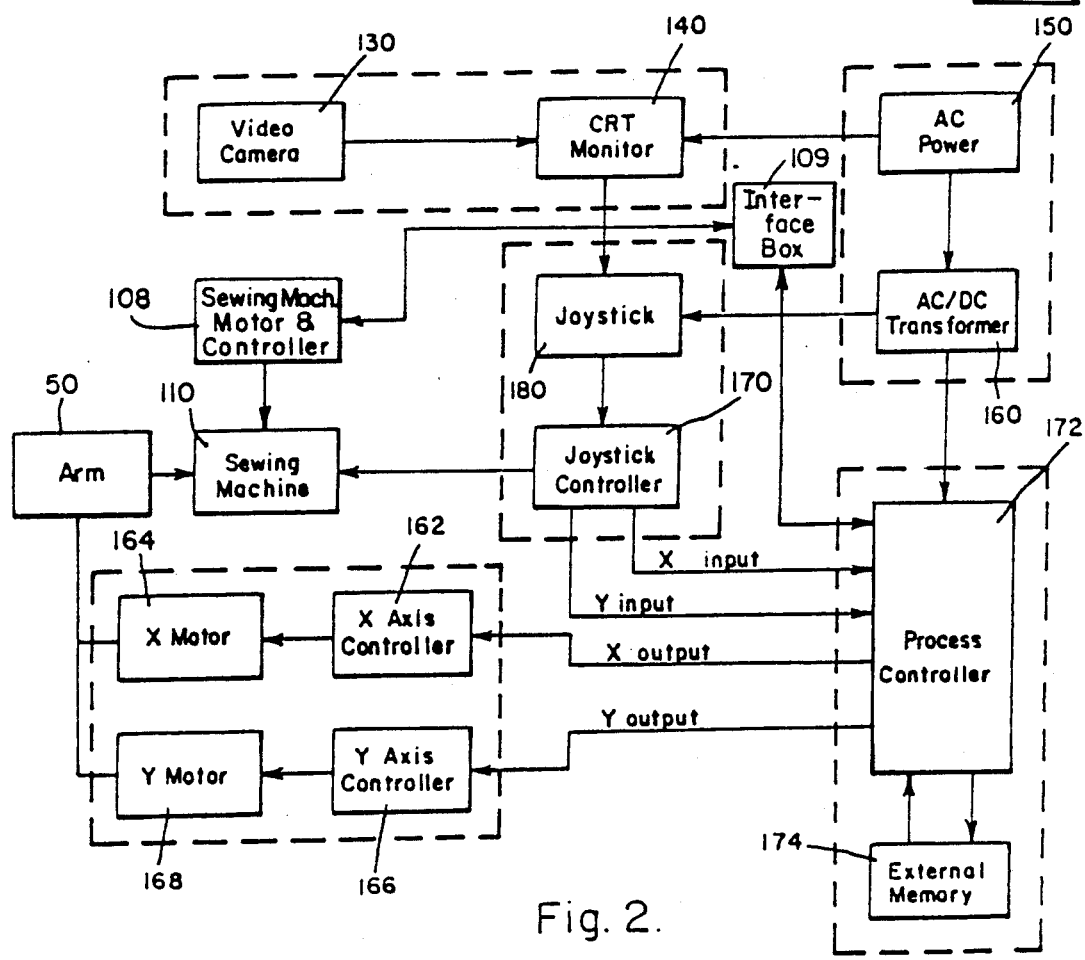
FIG. 2 is a block diagram of the components of the automatic quilting machine including pattern duplication through a reprogrammable computer.

While the prior art includes a handle at the front of the U-shaped frame, usually on the upper arm 52 and the U-shaped frame is physically moved relative to the fabric as it moves in the Y-direction from the feed rollers to the pickup roller, as previously discussed the U-shaped frame is heavy and exacts a physical wear and tear on the operator. While physical movement is practical for standard stitching to sew the outer fabrics to the interior filler member or sew the two outer fabrics together and retain the interior filler member between them, for intricate pattern stitching this is not practical as the U-shaped arm cannot be moved fast enough to accommodate an intricate pattern. Therefore, an automatic electrical system for moving the U-shaped member and sewing machine head and needle thereon relative to the fabric is required. A block diagram of the electronics for performing this operation is presented in FIG. 2. A source of alternating current power 150 energizes the entire system. As previously discussed, in one connection, the source of alternating current power 150 is connected to the monitor 140 which in turn energizes the video camera 130. In a second connection, the alternating current source is connected to an alternating current to direct current transformer 160. The transformer 160 is in turn connected to a process controller or computer 172 which provides control functions for movement of the U-shaped frame 50 in the X-direction, the Y-direction, and therefore the X-Y direction both for the initial pattern being traced and for subsequent duplication of the pattern as will be discussed hereafter. The AC to DC transformer 160 is also connected to a joystick 180 which in turn is connected to a joystick controller 170. The joystick controller 170 has an X-axis input and a Y-axis input into the process controller or computer 172. The joystick controller 170 is in turn also connected to the sewing machine 110. The process controller 172 has an X-direction output which in turn is connected to an X-axis controller 162 which in turn is connected to the X direction motor 164 is which a direct current motor. The process controller 172 also has a Y-direction output which in turn is connected to a Y-axis controller 166 which in turn is connected to the Y direction motor 168 is which a direct current motor. In the block diagram on FIG. 2, the process controller 172 is also shown connected to an external memory 174. It is also within the spirit and scope of the present invention for the process controller to have an internal memory. The process controller 172 is also connected to the sewing machine computer or controller 108 which is in turn connected to the sewing machine 110. The sewing machine controller 108 also is connected to the sewing machine motor.

The joystick 180 is a bi-directional joystick with a variable speed range to permit the operator to make high-speed and low-speed moves of the U-shaped frame 50. By way of example, the high-speed may be set to a maximum diagonal speed of approximately fifty feet per minute. Limit switches may be included to prevent the U-shaped frame's overtravel. The joystick 180 through the joystick controller 170 can also be used to control the speed of the sewing machine 110. Alternatively, commands from the process controller 172 can be used to control the sewing machine controller 108 which in turn governs the sewing machine 110. The DC motors 164 and 168 may be variable speed motors which are coupled to the gear and rack assemblies of the U-shaped frame through conventional drive belts, gears and racks, as previously described. The mechanical portion of the drive system can be suitable for adaptation to a computer controlled servo system and can therefore be controlled by the process controller 172. The electronic control components including the AC to DC transformer 160, the X-axis controller 162, the Y-axis controller 166, the X-direction motor 164, the Y-direction motor 168 the joystick controller 170, and the sewing machine process controller 108 can all be housed in a supporting box member 41 which can rest adjacent the roll to roll machine 10 or be attached to any portion of the machine such as to frame member 42. In the illustration of Figure 1, the process controller 172 is shown adjacent the monitor 140. It is also possible to house the process controller 172 and its external memory 174 within box member 41.

Therefore, through use of the present invention, an operator can hold the joystick 180 in his/her hand and watch the color video monitor 140. With the color video camera 130, equipped if desired with a wide angle or telephoto lens, focusing on the area where the sewing needle 112 is sewing the layers of fabric 20, 32 and filler material 24 into a quilt 100, and the area illuminated by the source of light 120, the operator receives a detailed and clear view of the sewing needle as it is sewing the stitch into the fabric. Through use of the joystick 180 and joystick controller 170 connected to the sewing machine head 110, the speed of the needle can be varied according to the stitch desired. The process controller 172 through commands to the sewing machine controller 108 can also be programmed to command the stitching functions. The two outer pieces of fabric 20 and 32 can be sewn together entrapping the filler material 24 between them or the two pieces of fabric 20 and 32 and the internal filler material 24 can be sewn together. The completed stitched together quilt can then be placed on one of the feed rollers and on a second pass through, an individual pattern can be sewn as if by hand since the U-shaped frame 50 can be guided in an X-direction or for a limited distance in the Y direction or combination X-Y diagonally oriented direction by use of the joystick 180 which through the joystick controller 170 feeds the commands through the X-input and Y-input into the process controller 172 which in turn processes the data and through its X output and Y output feeds the information into the X axis controller and Y axis controller respectively to in turn activate the X-direction motor and the Y-direction motor to engage the gear and rack system and cause the U-shaped frame 50 to be moved in the X-direction, the Y-direction, and the XY combined direction, as previously described. Therefore, by watching the image on the monitor 140, the operator can cause the U-shaped frame 50 and sewing machine head 110 and needle 112 to be moved in any desired direction relative to the fabrics 20 and 32 and filler 24 so they can be sewn together or so that an individual pattern of any desired shape and size can be sewn into the quilt 100. A microprocessor in the joystick controller 170 helps to control the speed of sewing (with commands to the sewing machine process controller 108) and the movement of the U-shaped frame 50. As the fabrics 20 and 34 and filler material 24 move in the Y-direction, they are supported onto by the feed rollers, the pickup rollers and any intervening guide rollers, and therefore as they pass in the gap H between the sewing machine needle 112 and the sewing machine plate 114, the sewing machine needle 112 can sew through the fabrics and filler material or sew a pattern in to fabric or formed quilt (on a second pass) at any location in an unimpeded manner.

The apparatus is designed with two modes which can be selected by an appropriate switch on the joystick 180 or on the process controller 172. The first mode is the manual mode which is the manual operating mode of the machine wherein the operator has complete control of the X-Y motion functions of the machine and can trace each individual pattern as it is being sewn on the upper layer of fabric 20 or the formed quilt 100, as described above. The apparatus also has the capability of duplicating the original hand designed pattern at any multiplicity of locations on the fabric 20 or formed quilt or bedspread 100 through a trace and duplicate mode. The operator first selects the "Trace" mode and while using the joystick 180 traces the pattern on the fabric 20 or formed quilt 100, as just described. As the pattern is being traced and sewn, the process controller is having the pattern encoded in its external memory 174 (or internal memory) and will generate and store in its memory a digitalized image of the pattern. Next, through use of the joystick 180, the operator will cause the U-shaped frame 50 to be moved in any multiplicity of X and Y directions to arrive at various locations on the fabric 20 or formed quilt 100. As the sewing machine head 110 arrives at a location where the desired pattern is to begin, a command will be encoded in the process controller memory to mark this location for the traced pattern to be sewn. The various starting locations are marked at each desired point in this manner. In its simplest form, only one point per pattern need be marked. It is also possible to mark a series of points for each pattern when more complex patterns are involved. At the end of this step, the process controller 172 will have generated and stored a digitalized map of the area to be quilted. In the third step, which is a "Duplicate" mode, the operator will command the start of the automated quilting generated process and the location which has been marked. This third step can be executed independently of the first two steps as long as the selected memory bank has learned the stitch information. Therefore, once a hand selected sewn pattern has been made and stored in memory, this pattern can be sewn on the quilt and then re-sewn on subsequent quilts, without the necessity of the operator having to hand trace the pattern over and over again. As will be appreciated, a library of standard stitch patterns can be embedded into the process controller to be called up by the operator at any future time.

In addition, an important design element of the present system is that the process controller 172 which controls the X-Y movement of the U-shaped frame 50 and the trace pattern which is stored in the computer's memory as a digitalized pattern is separate from the computer 108 in the sewing head 110 which controls the sewing needle stitch and speeds. This is accomplished by using a sewing head which has its own independent computer such as a Mitsubishi Industrial Sewing Machine Model LS2-180 high speed, single needle lockstitch sewing machine or the Union Special 5630 chain stitch sewing machine. In this way, if it is necessary to add new stitch patterns into memory, it is a much simpler task to add the new stitch and program commands to the process controller 172 without also having to reprogram the stitching and other needle functions on the sewing machine head. In one embodiment, the process controller 172 is connected through an Interface Box 109 to the sewing machine process controller 108.

Because of the independent computer capability of the machine with one computer controlling the X-Y movement and a second computer on the sewing machine controlling the sewing and stitching functions, the operator can trace a straight line pattern into the X-Y process controller 172 and a software program command to the X-Y process controller 172 will enable the pattern to be automatically modified into a zig-zag or any other desired pattern. This is a valuable modification which cannot be easily achieved with prior art systems where the computer for the sewing machine and X-Y movement is integrated into one large computer. The software program for such prior art systems is too complicated. In such prior art systems, each stitch and each movement for each stitch would need to be programmed. In the prior art you have for example 5 stitches per inch and 4,000 linear inches per fabric so 20,000 stitches and movements per stitch must be programmed. With the present invention, only the U-shaped frame needs to be programmed because the stitch pattern is a separate independent program controlled by a separate computer on the sewing machine.

Through use of the present invention, the rate of production is at least three to five times greater than that of hand-guided skilled operators. The training time required to teach the operator to use the present system is only one week, as opposed to four to six months for a conventional system. The present system can even be used by a non-skilled operator instead of the high-skilled operators required to operate present day systems. The high resolution color video camera and monitor allow the operator to see close-up views of the sewing operation from any distance. The risk of injury to the operator is significantly reduced since the operator is positioned at a remote location from the sewing needle and the moving U-shaped frame and therefore does not come in contact or near contact with moving parts.

The present system can also be combined with well known preprogrammed computer controlled systems. The attachment from the joystick interface card 170 can be attached to a computer which receives preprogrammed patterns. The computer can be programmed to move the U-shaped frame 50 and sewing needle 112 relative to the fabric 20 or formed quilt 100 and can be therefore programmed to stitch a preprogrammed pattern into the quilt or bedspread. Therefore, the preprogrammed patterns can be stitched into part of the fabric or quilt or bedspread and the precise individual hand sewn patterns can be sewn into another portion of the bedspread. After the programmed patterns are completed, the computer is disconnected and the joystick reconnected to the joystick interface card and the precise hand sewing is performed. Of course, the hand sewing can be done first and then the preprogrammed pattern can be sewn afterward by attachment of the computer.

Therefore, the present invention can be defined as a roll to roll apparatus for sewing thread into material comprising: (a) a vertically oriented U-shaped frame member having a horizontal upper arm, a horizontal lower arm and defining a U-shaped throat between the two arms; (b) said vertically oriented U-shaped frame member mounted on a structure which can be moved in the X-direction, the Y-direction, or any X-Y combination direction; (c) a first motor to generate movement of said vertically oriented U-motor shaped frame member in the X-direction; (d) an X axis controller connected to said first motor; (e) a second motor to generate movement of said vertically oriented U-shaped frame member in the Y-direction; (f) a Y axis controller connected to said second motor; (g) a remote control apparatus for controlling the movement of said structure and said vertically oriented U-shaped frame member to enable the vertically oriented U-shaped frame to be moved horizontally in the X-direction, the Y-direction, and any combination X-Y direction; (h) said remote control apparatus connected to a source of power; (i) a sewing machine head attached to said horizontal upper arm and having a source of thread; (j) a sewing needle extending from said sewing machine head and positioned to sew threads into material which passes between the horizontal upper arm and horizontal lower arm of the vertically oriented U-shaped member; (k) a sewing machine plate attached to said horizontal lower arm and aligned with said sewing machine head and sewing needle; (l) a multiplicity of feed rollers, with each respective feed roller carrying a roll of material; (m) a pickup roller extending transversely through the open throat of said said vertically oriented U-shaped member; (n) guide means to guide the respective material from each of said multiplicity of feed rollers onto said pickup roller such that the material is formed into a layer of materials which moves in the Y-direction and is passed between the sewing needle and sewing machine plate prior to arriving at the pickup roller; (o) a source of illumination focused on the intersection of said sewing machine needle and layer of materials; (p) a video camera movably secured to said horizontal upper arm and focused on the intersection of said sewing machine needle and layer of materials; (q) said video camera connected to a monitor; (r) a process controller having an X input and a Y input connected to said remote control apparatus, the process controller also connected to said X axis controller through an X input and to said Y axis controller through a Y input; and (s) said process controller connected to said source of power; (t) whereby an operator may view the needle sewing thread into the layer of materials on the video monitor and may control the movement of the vertically oriented U-shaped frame and sewing needle relative to the layer of materials by said remote control apparatus through generation of commands input into the process controller which in turn generates commands to the first motor through the X axis controller and to the second motor through the Y axis controller.

In the preferred embodiment, said process controller further comprises a memory to receive and store information of a pattern traced through the remote store information of a pattern traced through the remote control apparatus, whereby the remote control apparatus can be used to trace a pattern to be sewn into the layers of material, cause the vertically oriented U-shaped frame member and sewing needle to move relative to the layers of material as they are being wound onto the pickup roller, to trace the selected pattern and further to mark locations where the pattern is to be sewn into the layers of material, and the pattern and locations can be stored in the memory of the process controller to have the process controller subsequently cause the apparatus to sew the desired pattern at each marked location on the layers of material.

By way of example, said source of power is an alternating current source which is connected to an alternating current to direct current transformer.

In the preferred embodiment, said remote control apparatus is a joystick and a joystick controller, wherein the joystick is connected to the source of power and is also connected to the joystick controller which in turn is connected to the process controller through the X input and Y input of the process controller.

In the preferred embodiment, said source of illumination is attached to said horizontal upper arm.

By way of example, said video camera is a color video camera.

By way of example, said monitor is a color monitor.

In the preferred embodiment, said video camera is equipped with a wide angle lens.

In the preferred embodiment, said multiplicity of feed rollers comprise three feed rollers, a first feed roller carrying outer material, a second feed roller carry filler material, and a third feed roller carrying inner material such that the three layers of material sewing together form a bedspread.

In the preferred embodiment, said multiplicity of feed rollers comprise three feed rollers, a first feed roller carrying outer material, a second feed roller carry filler material, and a third feed roller carrying inner material such that the three layers of material sewing together form a bedspread.

In the preferred embodiment, said sewing machine head and plate are aligned such that said sewing needle is at the approximate center line of said layers of material and said U-shaped frame member can move in the X-direction relative to said layers of material to be able to reach any widthwise portion of the layers of material as the material moves in the Y-direction onto the pickup roller.

The speed of said sewing needle is controlled by said remote control apparatus.

In the preferred embodiment, said sewing machine head is equipped with a separate computer to control the sewing and stitching functions. As a result, an operator can trace a straight-line pattern into the process controller and a software program in the process controller combined with the computer on the sewing machine head will enable the pattern to be automatically modified into a zig-zag or any other desired pattern.

The present invention is also defined as a roll to roll apparatus for sewing thread into material comprising: (a) a vertically oriented U-shaped frame member having a horizontal upper arm, a horizontal lower arm and defining a U-shaped throat between the two arms; (b) said vertically oriented U-shaped frame member mounted on a structure which can be moved in the X-direction, the Y-direction, or any X-Y combination direction; (c) means for generating the horizontal movement of said vertically oriented U-shaped frame member in the X-direction, the Y-direction, or any combination X-Y direction; (d) a manually operated remote control apparatus for controlling the movement of said structure and said vertically oriented U-shaped frame member to enable the vertically oriented U-shaped frame to be moved horizontally in the X-direction, the Y-direction, and any combination X-Y direction; (e) said remote control apparatus connected to a source of power; (f) a sewing machine head attached to said horizontal upper arm and having a source of thread; (g) a sewing needle extending from said sewing machine head and positioned to sew threads into material which passes between the horizontal upper arm and horizontal lower arm of the vertically oriented U-shaped member; (h) a sewing machine plate attached to said horizontal lower arm and aligned with said sewing machine head and sewing needle; (i) a multiplicity of feed rollers, with each respective feed roller carrying a roll of material; (j) a pickup roller extending transversely through the open throat of said said vertically oriented U-shaped member; (k) guide means to guide the respective material from each of said multiplicity of feed rollers onto said pickup roller such that the material is formed into a layer of materials which moves in the Y-direction and is passed between the sewing needle and sewing machine plate prior to arriving at the pickup roller; (l) a first process controller having an X input and a Y input connected to said remote control apparatus, the process controller also connected to said means for generating horizontal movement of said vertically oriented U-shaped frame member; (m) a source of power connected to said remote control apparatus and also connected to said process controller; (n) a second process controller connected to said sewing machine head for controlling stitching and other sewing functions of the sewing machine head; and (o) said first process controller connected to said second process controller.

The present invention is also the method of repetitively sewing a pattern into material on a roll to roll apparatus comprising: (a) positioning a sewing machine head having a source of thread and a sewing needle relative to said material; (b) retaining said material on a structure which causes said material to move in a horizontal Y-direction from at least one feed roller to a pickup roller such that the material passes by and is positioned relative to the sewing needle such that a portion of the surface of the material is reached by the sewing needle so that thread can be sewn into the material; (c) obtaining an electrically generated video image of the intersection of the sewing needle and material; (d) controlling the movement of the sewing machine head by a remote control apparatus and determining the direction of movement based upon the video image of the intersection of the sewing needle and material; and (e) storing the information on the movement of the sewing machine head into the memory of a process controller; (f) whereby the process controller can cause the movement of the sewing machine head relative to the material to be subsequently repeated at any multiplicity of locations on the material.

The preferred method further comprises illuminating the intersection of said sewing needle and said fabric.

The preferred method further comprises controlling the sewing and stitching functions through a separate computer in said sewing machine head.

The preferred method further comprises further comprising tracing a straight-line pattern into the process controller and automatically creating a modification of the pattern into a zig-zag or any other desired pattern through a software program in the process controller combined with the computer controlling the sewing and stitching functions.

The present invention is also the method of repetitively comprising: (a) positioning a sewing machine head having a source of thread and a sewing needle relative to said material; (b) retaining said material on a structure which causes said material to move in a horizontal Y-direction from at least one feed roller to a pickup roller such that the material passes by and is positioned relative to the sewing needle such that a portion of the surface of the material is reached by the sewing needle so that thread can be sewn into the material; (c) controlling the movement of the sewing machine head by a remote control apparatus; and (d) storing the information on the movement of the sewing machine head into the memory of a first process controller and further controlling the movement of the sewing machine head relative to the material through commands from the first process controller; and (e) causing said sewing machine head to perform stitching and alternative sewing machine functions from commands through a second process controller.

In the preferred method, the modification to the movement of said movable structure is made through reprogramming said first process controller.

In the preferred method, the modification to the stitching function of the sewing machine head is made through reprogramming said second process controller.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus is intended only for illustration and for disclosure of an operative embodiment and not to show all of the various forms or modification in which the invention might be embodied or operated.

The invention has been described in considerable detail in order to comply with the patent laws by providing full public disclosure of at least one of its forms. However, such detailed description is not intended in any way to limit the broad features or principles of the invention, or the scope of patent monopoly to be granted.

What is claimed is:

1. A roll to roll apparatus for sewing thread into material comprising:
   a. a vertically oriented U-shaped frame member having a horizontal upper arm, a horizontal lower arm and defining a U-shaped throat between the two arms;
   b. said vertically oriented U-shaped frame member mounted on a structure which can be moved in the X-direction, the Y-direction, or any X-Y combination direction; vertically oriented U-shaped frame member in the X-direction;
   d. an X axis controller connected to said first motor;
   e. a second motor to generate movement of said vertically oriented U-shaped frame member in the Y-direction;
   f. a Y axis controller connected to said second motor;
   g. a process controller connected to said X axis controller through an X input and to said Y axis controller through a Y input;
   h. said process controller connected to a source of power;
   i. a sewing machine head attached to said horizontal upper arm and having a source of thread;
   j. a sewing needle extending from said sewing machine head and positioned to sew threads into material which passes between the horizontal upper arm and horizontal lower arm of the vertically oriented U-shaped member;
   k. a sewing machine plate attached to said horizontal lower arm and aligned with said sewing machine head and sewing needle;
   l. a multiplicity of feed rollers, with each respective feed roller carrying a roll of material;
   m. a pickup roller extending transversely through the open throat of said said vertically oriented U-shaped member;
   n. guide means to guide the respective material from each of said multiplicity of feed rollers onto said pickup roller such that the material is formed into a layer of materials which moves in the Y-direction and is passed between the sewing needle and sewing machine plate prior to arriving at the pickup roller;
   o. a source of illumination focused on the intersection of said sewing machine needle and layer of materials;
   p. a video camera movably secured to said horizontal upper arm and focused on the intersection of said sewing machine needle and layer of materials; and
   q. said video camera connected to a monitor;
   r. whereby an operator may view the needle sewing thread into the layer of materials on the video monitor and may control the movement of the vertically oriented U-shaped frame and sewing needle relative to the layer of materials by commands input into the process controller which in turn generates commands to the first motor through the X axis controller and to the second motor through the Y axis controller.

2. An apparatus in accordance with claim 1 wherein said process controller further comprises a memory to receive and store information of a traced pattern and subsequently cause the apparatus to sew the desired pattern at each located which is marked on the layers of material.

3. An apparatus in accordance with claim 1 wherein said source of power is an alternating current source which is connected to an alternating current to direct current transformer.

4. An apparatus in accordance with claim 1 wherein said source of illumination is attached to said horizontal upper arm.

5. An apparatus in accordance with claim 1 wherein said video camera is a color video camera.

6. An apparatus in accordance with claim 5 wherein said monitor is a color monitor.

7. An apparatus in accordance with claim 1 wherein said video camera is equipped with a wide angle lens.

8. An apparatus in accordance with claim 1 wherein said multiplicity of feed rollers comprise three feed rollers, a first feed roller carrying outer material, a second feed roller carry filler material, and a third feed roller carrying inner material such that the three layers of material sewing together form a bedspread.

9. An apparatus in accordance with claim 1 wherein said multiplicity of feed rollers comprise three feed rollers, a first feed roller carrying outer material, a second feed roller carry filler material, and a third feed roller carrying inner material such that the three layers of material sewing together form a bedspread.

10. An apparatus in accordance with claim 1 wherein said sewing machine head and plate are aligned such that said sewing needle is at the approximate center line of said layers of material and said U-shaped frame member can move in the X-direction relative to said layers of material to be able to reach any widthwise portion of the layers of material as the material moves in the Y-direction onto the pickup roller.

11. An apparatus in accordance with claim 1 wherein the speed of said sewing needle is controlled by said remote control apparatus.

12. An apparatus in accordance with claim 1 wherein said sewing machine head is equipped with a separate computer to control the sewing and stitching functions.

13. An apparatus in accordance with claim 12 wherein an operator can trace a straight-line pattern into the process controller and a software program in the process controller combined with the computer on the sewing machine head will enable the pattern to be automatically modified into a zig-zag or any other desired pattern.

14. A roll to roll apparatus for sewing thread into material comprising:
 a. a vertically oriented U-shaped frame member having a horizontal upper arm, a horizontal lower arm and defining a U-shaped throat between the two arms;
 b. said vertically oriented U-shaped frame member mounted on a structure which can be moved in the X-direction, the Y-direction, or any X-Y combination direction;
 c. means for generating the horizontal movement of said vertically oriented U-shaped frame member in the X-direction, the Y-direction, or any combination X-Y direction;
 d. a process controller having an X input and a Y input connected to said means for generating horizontal movement of said vertically oriented U-shaped frame member;
 e. a source of power connected to said process controller;
 f. a sewing machine head attached to said horizontal upper arm and having a source of thread;
 g. a sewing needle extending from said sewing machine head and positioned to sew threads into material which passes between the horizontal upper arm and horizontal lower arm of the vertically oriented U-shaped member;
 h. a sewing machine plate attached to said horizontal lower arm and aligned with said sewing machine head and sewing needle;
 i. a multiplicity of feed rollers, with each respective feed roller carrying a roll of material;
 j. a pickup roller extending transversely through the open throat of said said vertically oriented U-shaped member;
 k. guide means to guide the respective material from each of said multiplicity of feed rollers onto said pickup roller such that the material is formed into a layer of materials which moves in the Y-direction and is passed between the sewing needle and sewing machine plate prior to arriving at the pickup roller;
 l. a video camera movably secured to said horizontal upper arm and focused on the intersection of said sewing machine needle and layer of materials; and
 m. said video camera connected to a monitor;
 n. whereby an operator may view the needle sewing thread into the layer of materials on the video monitor and may control the movement of the vertically oriented U-shaped frame and sewing needle relative to the layer of materials by commands input into the process controller which in turn generates commands to the first motor through the X axis controller and to the second motor through the Y axis controller.

15. An apparatus in accordance with claim 14 further comprising a source of illumination focused on the intersection of said sewing machine needle and layer of materials.

16. An apparatus in accordance with claim 15 wherein said source of illumination is attached to said vertically oriented U-shaped member.

17. An apparatus in accordance with claim 14 wherein said video camera is movably attached to said vertically oriented U-shaped structure.

18. An apparatus in accordance with claim 14 wherein said sewing machine head is equipped with a separate computer to control the sewing and stitching functions.

19. An apparatus in accordance with claim 18 wherein an operator can trace a straight-line pattern into the process controller and a software program in the process controller combined with the computer on the sewing machine head will enable the pattern to be automatically modified into a zig-zag or any other desired pattern.

20. A roll to roll apparatus for sewing thread into material comprising:
 a. a vertically oriented U-shaped frame member having a horizontal upper arm, a horizontal lower arm and defining a U-shaped throat between the two arms;
 b. said vertically oriented U-shaped frame member mounted on a structure which can be moved in the X-direction, the Y-direction, or any X-Y combination direction;
 c. means for generating the horizontal movement of vertically oriented U-shaped frame member in the X-direction, the Y-direction, or any combination X-Y direction;
 d. a first process controller having an X input and a Y input connected to said means for generating horizontal movement of said vertically oriented U-shaped frame member;
 e. a source of power connected to said process controller;
 f. a sewing machine head attached to said horizontal upper arm and having a source of thread;
 g. a sewing needle extending from said sewing machine head and positioned to sew threads into material which passes between the horizontal upper arm and horizontal lower arm of the vertically oriented U-shaped member;
 h. a sewing machine plate attached to said horizontal lower arm and aligned with said sewing machine head and sewing needle;
 i. a multiplicity of feed rollers, with each respective feed roller carrying a roll of material;
 j. a pickup roller extending transversely through the open throat of said said vertically oriented U-shaped member;
 k. guide means to guide the respective material from each of said multiplicity of feed rollers onto said pickup roller such that the material is formed into a layer of materials which moves in the Y-direction and is passed between the sewing needle and sewing machine plate prior to arriving at the pickup roller;

l. a second process controller connected to said sewing machine head for controlling stitching and other sewing functions of the sewing machine head; and m. said first process controller connected to said second process controller.

21. The method of repetitively sewing a pattern into material on a roll to roll apparatus comprising
   a. positioning a sewing machine head having a source of thread and a sewing needle relative to said material;
   b. retaining said material on a structure which causes said material to move in a horizontal Y-direction from at least one feed roller to a pickup roller such that the material passes by and is positioned relative to the sewing needle such that a portion of the surface of the material is reached by the sewing needle so that thread can be sewn into the material;
   c. obtaining an electrically generated video image of the intersection of the sewing needle and material:
   d. controlling the movement of the swing machine head by a process controller and determining the direction of movement based upon the video image of the intersection of the sewing needle and material; and
   e. storing the information on the movement of the sewing machine head into the memory of said process controller;
   f. whereby the process controller can cause the movement of the sewing machine head relative to the material to be subsequently repeated at any multiplicity of locations on the material.

22. The method in accordance with claim 21, further comprising illuminating the intersection of said sewing needle and said fabric.

23. The method in accordance with claim 21, further comprising controlling the sewing and stitching functions through a separate computer in said sewing machine head.

24. The method in accordance with claim 23 further comprising tracing a straight-line pattern into the process controller and automatically creating a modification of the pattern into a zig-zag or any other desired pattern through a software program in the process controller combined with the computer controlling the sewing and stitching functions.

25. The method of repetitively sewing a pattern into material on a roll to roll apparatus comprising:
   a. positioning a sewing machine head having a source of thread and a sewing needle relative to said material;
   b. retaining said material on a structure which causes said material to move in a horizontal Y-direction from at least one feed roller to a pickup roller such that the material passes by and is positioned relative to the sewing needle such that a portion of the surface of the material is reached by the sewing needle so that thread can be sewn into the material;
   c. controlling the movement of the sewing machine head by a first process controller;
   d. storing the information on the movement of the sewing machine head into the memory of said first process controller and further controlling the movement of the sewing machine head relative to the material through commands from the first process controller; and
   e. causing said sewing machine head to perform stitching and alternative sewing machine functions from commands through a second process controller.

26. The method in accordance with claim 25 wherein modification to the movement of said movable structure is made through reprogramming said first process controller.

27. The method in accordance with claim 25 wherein modification to the stitching function of the sewing machine head is made through reprogramming said second process controller.

* * * * *